United States Patent
Wu

(10) Patent No.: US 11,831,242 B2
(45) Date of Patent: Nov. 28, 2023

(54) CONTROL MODULE AND MULTI-PHASE POWER CONVERTER

(71) Applicant: Silergy Semiconductor Technology (Hangzhou) LTD, Hangzhou (CN)

(72) Inventor: Dong Wu, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 17/367,753

(22) Filed: Jul. 6, 2021

(65) Prior Publication Data

US 2022/0038008 A1 Feb. 3, 2022

(30) Foreign Application Priority Data

Jul. 29, 2020 (CN) .......................... 202010747448.5

(51) Int. Cl.
*H02M 3/158* (2006.01)
*H02M 1/088* (2006.01)

(52) U.S. Cl.
CPC ......... *H02M 3/1584* (2013.01); *H02M 1/088* (2013.01)

(58) Field of Classification Search
None
See application file for complete search history.

(56) References Cited

U.S. PATENT DOCUMENTS

| | | | |
|---|---|---|---|
| 6,670,794 B1 | 12/2003 | Wang et al. | |
| 7,215,102 B2 * | 5/2007 | Harris | H02M 3/1584 323/268 |
| 7,733,675 B2 | 6/2010 | Wu et al. | |
| 8,134,353 B2 | 3/2012 | Chen et al. | |
| 8,493,044 B2 * | 7/2013 | Xu | H02M 3/1584 323/282 |
| 9,071,164 B2 | 6/2015 | Schroeder et al. | |
| 9,263,955 B2 | 2/2016 | Schmid et al. | |
| 9,912,240 B1 * | 3/2018 | Nguyen | H02M 1/36 |
| 10,491,106 B2 | 11/2019 | Bhandarkar et al. | |
| 2012/0200274 A1 | 8/2012 | Tang et al. | |
| 2016/0036222 A1 * | 2/2016 | Templeton | H02J 1/10 307/24 |
| 2021/0028683 A1 * | 1/2021 | Jiang | H02M 1/084 |
| 2021/0028686 A1 * | 1/2021 | Jiang | H02M 1/32 |

FOREIGN PATENT DOCUMENTS

CN 106416034 A 2/2017
CN 206259862 U 6/2017

* cited by examiner

*Primary Examiner* — Jeffrey A Gblende

(57) ABSTRACT

An apparatus includes a plurality of control modules coupled to a multi-phase power converter having a plurality of power stage circuits correspondingly coupled to the plurality of control modules, where each control module includes: a first port coupled to a second port of a previous control module; a second port coupled to a first port of a next control module, and being configured to generate a transmission signal for the next control module; and where the transmission signal represents at least two types of information, and is configured to control the corresponding power stage circuit to operate sequentially.

18 Claims, 5 Drawing Sheets

CONTROL MODULE AND MULTI-PHASE POWER CONVERTER

RELATED APPLICATIONS

This application claims the benefit of Chinese Patent Application No. 202010747448.5, filed on Jul. 29, 2020, which is incorporated herein by reference in its entirety.

FIELD OF THE INVENTION

The present invention generally relates to the field of power electronics, and more particularly to control modules and multi-phase power converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In many application scenarios of power converters, in order to reduce the size of an output filter inductor of the converter, a multi-phase parallel interleaving method can be adopted. Each phase converter may correspond to a filter inductor, and the output terminals of each phase converter can connect to one same output filter capacitor. The current provided by the original single-phase converter can be shared by the multi-phase converter, which may reduce the current burden that each phase converter needs to bear. Therefore, a relatively simple and efficient multi-phase power converter with interleaved parallel connection may be particularly important.

Figure 1:
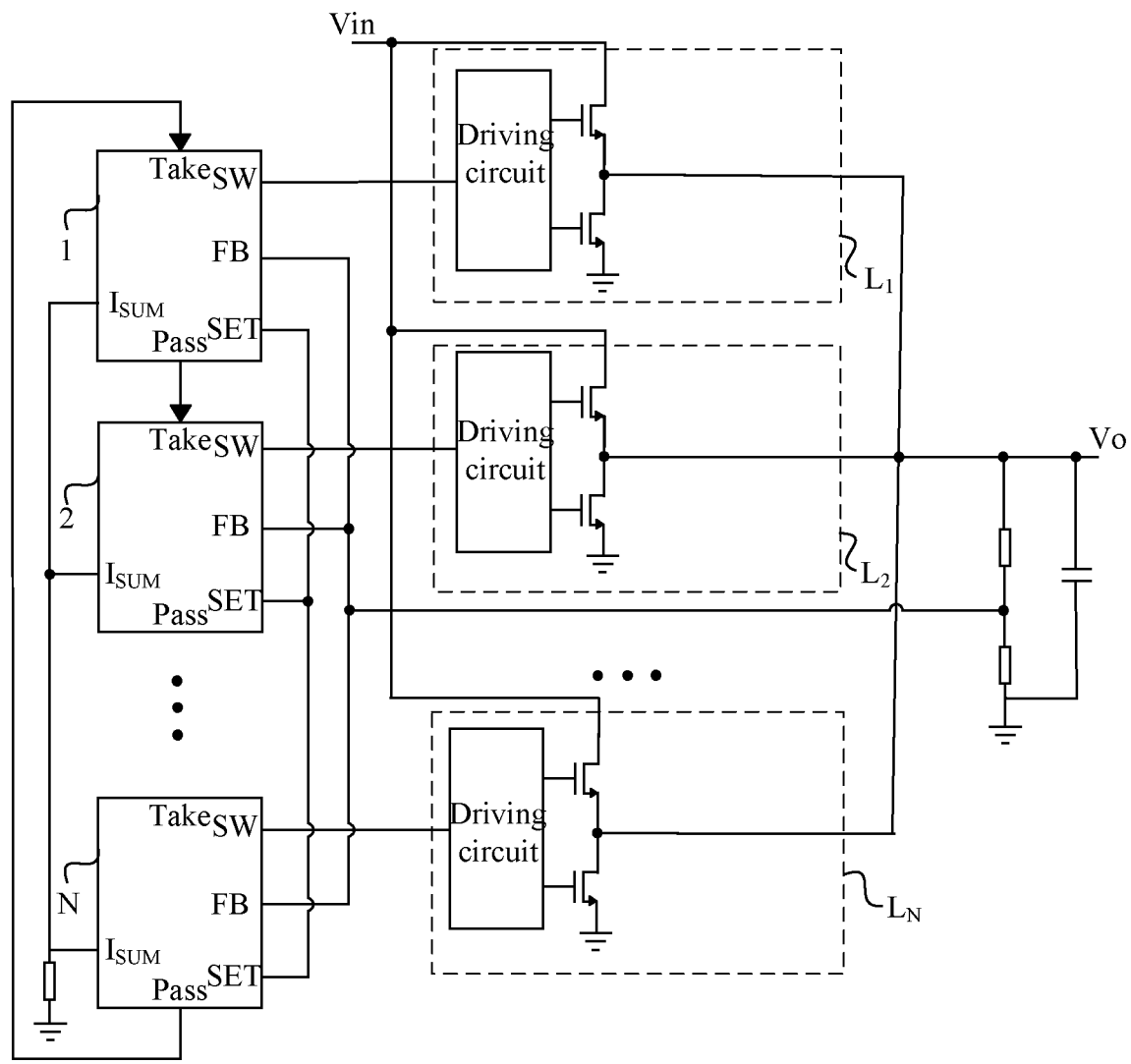
FIG. 1 is a schematic block diagram of an example multi-phase power converter.

Referring now to FIG. 1, shown is a schematic block diagram of an example multi-phase power converter. The multi-phase power converter can include N control modules and N power stage circuits $L_1$-$L_N$ coupled in parallel. As used herein, a "module" can be any structure that includes hardware circuitry, such as an integrated circuit (IC). Each power stage circuit $L_n$ (n=1, 2, ..., N) may correspond to a control module. For example, each power stage circuit can include a driving circuit and a main power switch. The control module can include port Take, port Pass, and terminal SET. In this example, port Take of the current control module can connect to port Pass of the previous control module, in order to receive an indication signal for the current control module from the previous control module. Correspondingly, port Pass of the current control module can connect to the next control module, in order to transmit the indication signal to the next control module. Here, the indication signal may indicate the current control module to enter an enable state. In this example, the first control module can be configured as a master control module, and other control modules may be configured as slave control modules. The master control module can generate a synchronization control signal to control the operation states of all power stage circuits. In this example, ports SET of the N control modules can connect together to share the synchronization control signal. The current control module may enter the enable state after receiving the indication signal. After the enable state ends, when the corresponding synchronization control signal arrives, the corresponding power stage circuit can be controlled to enter the operation state, and the indication signal of the next control module may be generated at the same time.

Figure 2:
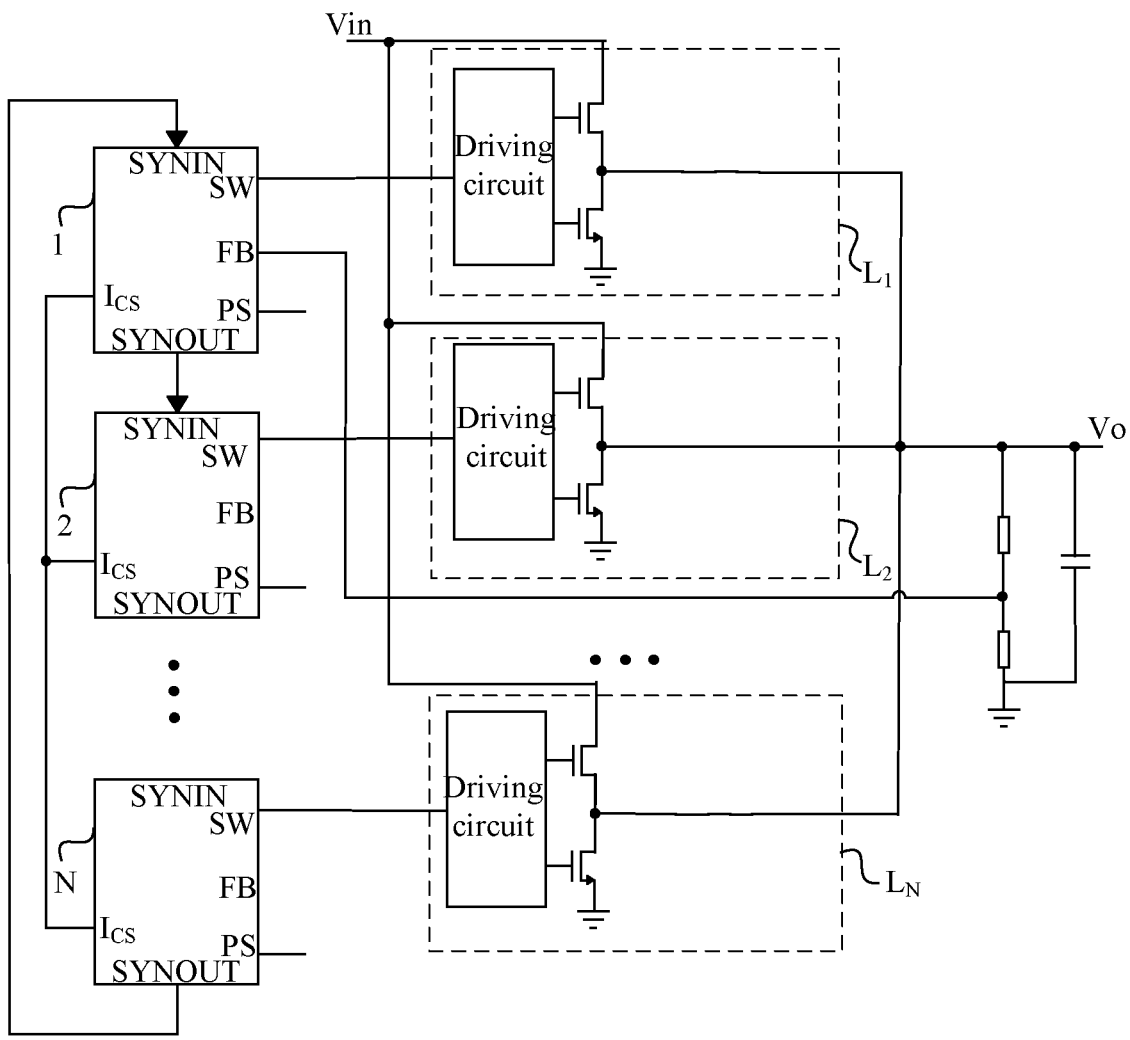
FIG. 2 is a schematic block diagram of an example multi-phase power converter, in accordance with embodiments of the present invention.

Referring now to FIG. 2, shown is a schematic diagram of an example multi-phase power converter, in accordance with embodiments of the present invention. In this example, the multi-phase power converter can include N control modules and N power stage circuits $L_1$~$L_N$ coupled in parallel. Each power stage circuit $L_n$ (n=1, 2 ... N) may correspond to each corresponding control module one-by-one. For example, each of the power stage circuits can include a driving circuit and a main power switch. The control module can include ports SYNIN and SYNOUT. Port SYNIN of the current control module can connect to port SYNOUT of the previous control module to receive transmission signal SYNINn (n=1, 2 ... N) for the current control module through port SYNOUT of the previous control module. Port SYNOUT of the current control module can connect to port SYNIN of the next control module to transmit the transmission signal to the next control module. The transmission signal may characterize at least two types of information, in order to control the power stage circuit to operate sequentially.

For example, the transmission signal can be a signal including multiple pulses with at least two different levels to represent at least two types of information. It should be understood that, in other examples, the transmission signal can also characterize the at least two kinds of information by including multiple pulses with different pulse widths; that is, as long as the two types of information can be distinguished by identifying the features of the signal. In this particular example, the transmission signal can include an indication signal and a synchronization control signal, and the indication signal and the synchronization control signal may be pulses with different levels. The indication signal may instruct the control module to enter the enable state. After entering the enable state, when the synchronization control signal arrives, the current control module may generate a pulse-width modulation (PWM) control signal according to the synchronization control signal to control the corresponding power stage circuit to operate, thereby adjusting the output signal of the multi-phase power converter.

In this example, the first control module can be configured as a master control module, the other modules are configured as slave modules, and the synchronization control signal may be generated by the master control module. For example, the indication signal can be characterized by a pulse with a first level, and the synchronization control signal may be characterized by a pulse with a second level. Here, the first level (e.g., 5V) can be greater than the second level (e.g., 3.3V). It can be understood that in other examples, the first level and the second level can also be changed, so long as the two levels are different.

The current control module may receive the indication signal generated by the previous control module to instruct the current control module to enter the enable state. After entering the enable state, when the synchronization control signal generated by the previous control module arrives, the corresponding power stage circuit may enter the operation state. The control module of certain embodiments can also include ports PS, FB, and SW. For example, port PS can receive the mode control signal for controlling the control module to operate in a normal mode or a phase-cut mode. In one example, port PS can connect to the power supply through a pull-up resistor, in order to set port PS to be at a high level. At this time, the control module may receive an active mode control signal, and the current control module can operate in a normal mode.

In another example, port PS can connect to a ground through a pull-down resistor to set port PS to be at a low level. At this time, the control module may receive an inactive mode control signal, and the current control module can operate in the phase-cut mode. When the current control module operates in the phase-cut mode, the current control module may only transmit the transmission signal, and the corresponding power stage circuit may not operate (be disabled). When the control module is the master control module, port FB can receive the feedback signal that characterizes the output signal of the multi-phase power converter and generates the synchronization control signal. That is, port FB of the slave control modules may essentially not receive any useful signal. Further, port SW of each control module can output the PWM control signal to control the operation state of the corresponding power stage circuit.

Figure 3:
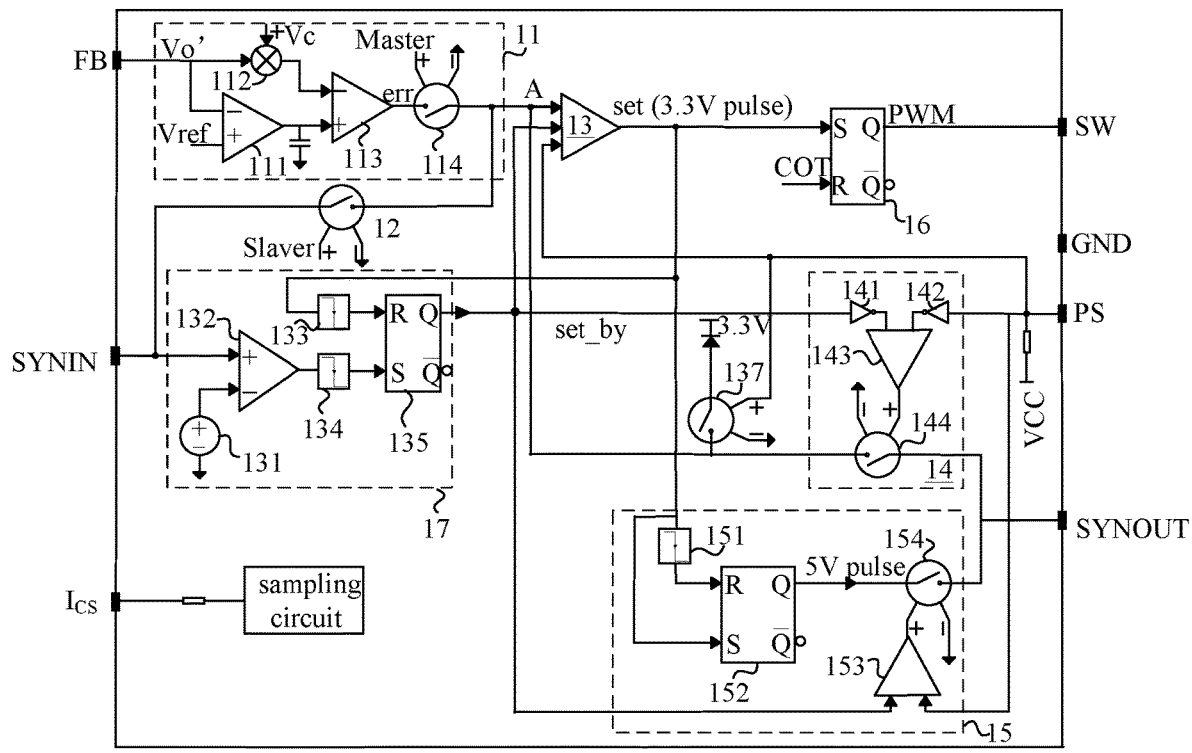
FIG. 3 is a schematic diagram of an example control module, in accordance with embodiments of the present invention.

Referring now to FIG. 3, shown is a schematic diagram of an example control module, in accordance with embodiments of the present invention. In this particular example, the control module can include synchronization control signal generation module 11, slave switch 12, set signal generation circuit 13, transmission module 14, transmission module 15, and a driving signal generation module. In this example, synchronization control signal generation module 11 can generate synchronization control signal err with the second level (e.g., 3.3V), based on reference signal Vref, feedback signal Vo', and ramp signal Vc, only when the control module is the master control module. For example, synchronization control signal generation module 11 can include amplifier 111, adder 112, comparator 113, and master switch 114, where master switch 114 is a controlled switch.

It should be noted that the control module can be selectively configured as the master control module or the slave control module according to requirements/applications. In some examples, when port SYNIN of one control module is connected to the power supply voltage via an external pull-up resistor, the control module can be set as the master control module, and other modules configured as slave control modules after the master control module is determined. In some examples, when the control module is configured as the master control module, terminal Master of master switch 114 can connect to the power supply voltage via an external pull-up resistor, such that master switch 114 is turned on.

In addition, synchronization control signal generation module 11 can generate synchronization control signal err (with the second level, e.g., 3.3V), according to reference signal Vref, feedback signal Vo', and ramp signal Vc. For example, amplifier 111 can receive reference signal Vref and feedback signal Vo' to generate a compensation signal, and comparator 113 can compare the compensation signal with ramp signal Vc plus feedback signal Vo' by adder 112 to generate synchronization control signal err. For example, ramp signal Vc may be generated according to the duty ratio of the power stage circuit, input voltage Vin, and output voltage Vo. When the control module is the slave module, terminal Slaver of slave switch 12 can connect to the power supply voltage via an external pull-up resistor, such that slave switch 12 may be turned on, and transmission signal SYNINn at the corresponding port can be transmitted to the input terminal of set signal generation circuit 13.

In some embodiments, set signal generation circuit 13 can generate set signal set (with the second level, e.g., 3.3V) according to the mode control signal at port PS, enable signal set_by having the same function as the indication signal, and synchronization control signal err. For example, set signal set can control the main power switch of the corresponding power stage circuit to be turned on. For example, set signal generation circuit 13 can include an AND-gate circuit, and when the mode control signal, enable signal set_by, and synchronization control signal err are all active (e.g., at high levels), set signal set can be active (e.g., at a high level).

The control module can also include enable signal generation circuit 17, including voltage source 131, comparison circuit 132, two one-shot triggers 133 and 134, and latch 135. Enable signal generation circuit 17 can generate enable signal set_by according to transmission signal SYNINn and set signal set. In this example, voltage source 131 may generate a threshold (e.g., 4.5V). It should be understood, e.g., that the threshold can be set between the first level and the second level. When the pulse level of transmission signal SYNINn is detected by comparison circuit 132 to be greater than the threshold, one-shot trigger 134 can be triggered at the falling edge of transmission signal SYNINn to generate a pulse signal to set latch 135, such that enable signal set_by output by latch 135 turns to be active (e.g., at a high level). When one-shot trigger 133 detects the falling edge of set signal set, one-shot trigger 133 can be triggered to generate a pulse signal to reset latch 135, such that enable signal set_by turns to be inactive (e.g., at a low level).

The driving signal generation module can include latch 16, which may generate PWM control signal PWM according to synchronization control signal err when the control module operates in the normal mode, so as to control the corresponding power stage circuit to enter the operation state, in order to adjust the output signal of the multi-phase power converter. In this example, latch 16 can be reset after a constant on time from it is set, thereby forming a constant on time (COT) control for the power stage circuit. For example, the constant on time can be determined by input voltage Vin and output voltage Vo of the multi-phase power converter.

In this example, transmission module 15 can generate an indication signal at port SYNOUT that may be transmitted to the next control module under the control of synchronization control signal err when the control module operates in the normal mode and is in the enable state. For example, transmission module 15 can include one-shot trigger 151, latch 152, AND-gate circuit 153, and controlled switch 154. For example, when the control module operates in the normal mode and the control module receives the indication signal, one-shot trigger 134 can be triggered at the falling edge of the indication signal with the first level greater than the threshold, thereby setting latch 135 to generate enable signal set_by. At this time, enable signal set_by can be at a high level and may enable the current control module to enter the enable state, waiting for the arrival of synchronization control signal err.

For example, in the enable state, when synchronous control signal err arrives, the current control module can generate set signal set (e.g., at a high level) to set latch 16, such that PWM control signal PWM is active to control the main power switch in the corresponding power stage circuit to be turned on; may enter that is, the corresponding power stage circuit enters the operation state. In addition, when set signal set is at a high level, latch 152 may also be set to generate a signal with a different level (first level, e.g., 5V) than set signal set (with second level, 3.3V). Further, since enable signal set_by is at a high level in the enable state and the control module operates in the normal mode (e.g., mode control signal is at a high level), AND-gate circuit 153 can generate a high level signal to turn on controlled switch 154, such that the signal generated by latch 152 can be transmitted to second port SYSNOUT as the indication signal. That is, transmission module 15 can generate the indication signal with the first level at port SYNOUT and transmit it to the next control module.

Transmission module 14 can allow synchronization control signal err to be transmitted to the next control module through port SYNOUT, after the control module exits the enable state. In this example, transmission module 14 can include inverters 141 and 142, OR-gate circuit 143, and controlled switch 144. For example, during the enable state, when synchronization control signal err turns to be a low level (e.g., zero), set signal set can turn to be a low level, such that latch 135 is reset and enable signal set_by is at a low level, and thus the control module may exit the enable state. Since enable signal set_by is at a low level, OR-gate circuit 143 can generate a high level signal to turn on controlled switch 144. Therefore, when the next synchronous control signal err arrives, port SYNOUT of the current control module can be directly connected with node A, and thus synchronous control signal err can be directly transmitted to the next control module through port SYNOUT, thereby controlling the next power stage circuit to operate after the next control module enters the enable state. In addition, the control module can also include clamp circuit 137 that may clamp the signal transmitted through transmission module 14 to port SYNOUT to be not greater than the second level (e.g., 3.3V).

In particular embodiments, in order to ensure the normal operation of the multi-phase power converter, the master control module (e.g., the first control module) may always operate in the normal mode, and the slave control modules can selectively operate in the normal mode or the phase-cut mode. When the current control module operates in the phase-cut mode, the mode control signal at port PS can be inactive (e.g., at a low level) and controlled switch 144 may be turned on to directly connect port SYNIN and port SYNOUT of the current control module. As such, the transmission signal including both synchronization control signal err and the indication signal generated by the previous control module can be directly transmitted to the next control module ignoring the current control mode, thereby realizing a phase cut. In the phase-cut mode, since set signal generation circuit 13 receives the inactive mode control signal from port PS, synchronization control signal err can effectively be ignored and set signal set can be at a low level. At this time, PWM control signal PWM may be inactive, such that the corresponding power stage circuit does not operate.

When the multi-phase power converter has "n" control modules and the n control modules all operate in the normal mode, the indication signals and set signals set of the n control modules can be active in turn, thereby controlling the corresponding power stage circuits to operate in turn within the operating periods of the n synchronous control signals. For example, n is less than or equal to N, and each is a positive integer. The multi-phase power converter can also realize phase-cut control, thereby adjusting the number of the operating phases of the multi-phase power converter and reducing the current burden of each phase power converter.

In some embodiments, the control module can also include a current detection circuit and a corresponding detection port ICS for realizing current sharing of the multi-phase power converter. For example, detection ports ICS of all control modules can connect to a current sharing bus. The current detection circuit can include a sampling circuit and a resistor, and the resistor can connect between the sampling circuit and detection ports ICS. Here, the sampling circuit may sample the output current of the phase power converter, and the current on the current sharing bus can be the average current of the output current of the multi-phase converter. The multi-phase power converter may adjust each phase current by taking the average current as the current reference value, thereby realizing current sharing of the multi-phase power converter.

Figure 4:
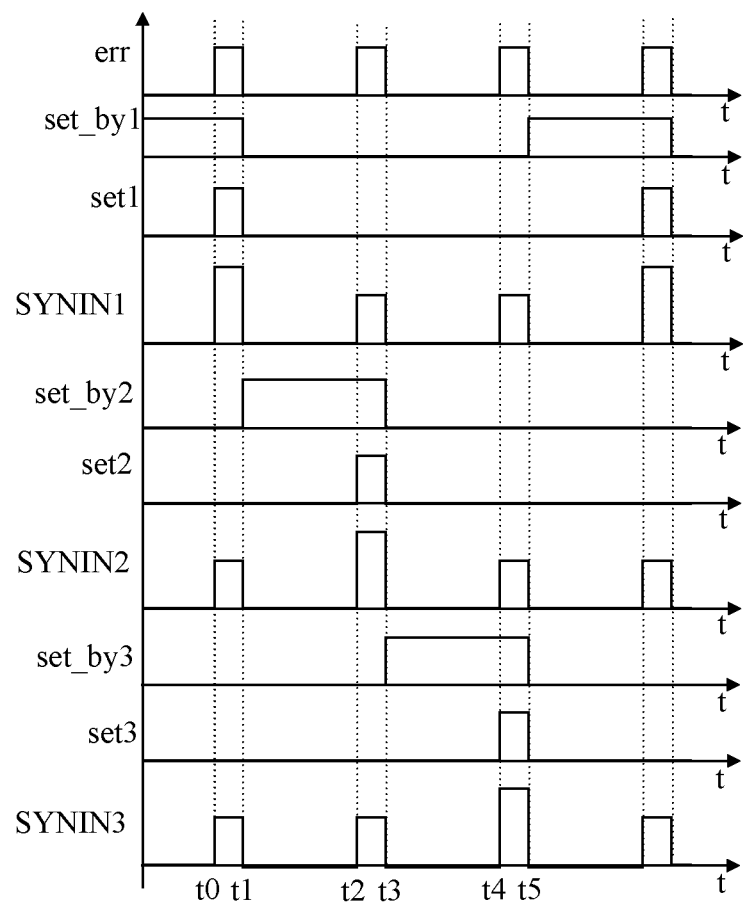
FIG. 4 is a logic timing diagram of first example operation of the multi-phase power converter, in accordance with embodiments of the present invention.

Referring now to FIG. 4, shown is a logic timing diagram of first example operation of the multi-phase power converter, in accordance with embodiments of the present invention. Here, a three-phase power converter is exemplified. In this particular example, the first control module can be set as the master control module, the other two control modules can be set as slave control modules, and the three control modules may operate in the normal mode. In this example, in order for description, the transmission signals output by the first to third control modules are respectively SYNIN1, SYNIN2, and SYNIN3, the enable signals generated by the first to third control modules are respectively set_by1, set_by2, and set_by3, and the set signal generated in the first to third control modules are respectively set1, set2, and set3.

During time period t0-t1, synchronization control signal generation module 11 in the first control module may generate the first pulse of synchronization control signal err with the second level, and enable signal set_by1 for the first control module can be initialized to be at a high level. Thus, set signal set1 can be at a high level, such that PWM control signal PWM is active to control the power stage circuit corresponding to the first control module to operate. Also, the indication signal with the first level may be generated at port SYNOUT (that is, the first pulse of transmission signal SYNIN1 in FIG. 4 is at the first level during time period t0-t1) and can be transmitted to port SYNIN of the second control module. During this period, the second control module may not enter the enable state; that is, enable signal set_by2 can be at a low level, such that controlled switch 144 may be turned on, and port SYNOUT can be directly connected to port SYNIN to receive the signal output by the first control module. However, the signal can be clamped by clamp circuit 137 to be at 3.3V, so the first pulse of transmission signal SYNIN2 may be at the second level and not first level during time period t0-t1. Similarly, the first pulse of transmission signal SYNIN3 may also be at the second level.

At time t1, the first control module can detect the falling edge of synchronization control signal err, and thus set signal set1 may turn to be at a low level, and thus enable signal set_by1 may turn to be at a low level. Thus, controlled switch 144 can be turned on for the following synchronization control signal err being directly transmitted to the next control module. In addition, the second control module may detect the falling edge of the indication signal (e.g., the first pulse of transmission signal SYNIN1), and thus enable signal set_by2 may turn to be at a high level, such that the second control module may enter the enable state.

During time period t2-t3, the first control module may generate the second pulse of synchronization control signal err. As described above, synchronization control signal err with the second level can be directly transmitted to port SYNIN of the second control module. As shown in FIG. 4, transmission signal SYNIN1 can be at the second level during time period t2-t3. In addition, set signal generation circuit 13 in the second control module can generate a high level set signal set2, such that PWM control signal PWM becomes active, and the power stage circuit corresponding to the second control module can operate. Also, the indication signal with the first level may be generated at port SYNOUT of the second control module and is transmitted to port SYNIN of the third control module. As shown in FIG. 4, transmission signal SYNIN2 can be at the first level during time period t2-t3.

At time t3, synchronization control signal err may turn to be at a low level, and then set signal set2 may also turn to be at a low level, and thus enable signal set_by2 may turn to be at a low level. In addition, the third control module can detect the falling edge of the indication signal (e.g., the second pulse of transmission signal SYNIN2), and thus enable signal set_by3 may turn to be at a high level, such that the third control module can enter the enable state.

During time period t4-t5, the first control module may generate the third pulse of synchronization control signal err. Also, enable signals set_by1 and set_by2 may both be at a low level, and controlled switches 144 in both first and second control module can be turned on, so the third pulse of synchronous control signal err may be directly transmitted to port SYNIN of the third control module, and the power stage circuit corresponding to the third control module can operate. In addition, the indication signal with the first level may be generated at port SYNOUT of the third control module and can be transmitted to port SYNIN of the first control module. At time t5, the first control module can detect the falling edge of the indication signal, and enable signal set_by1 may turn to be at a high level. After that, the multi-phase converter can operate periodically according to the above-mentioned operating process.

Figure 5:
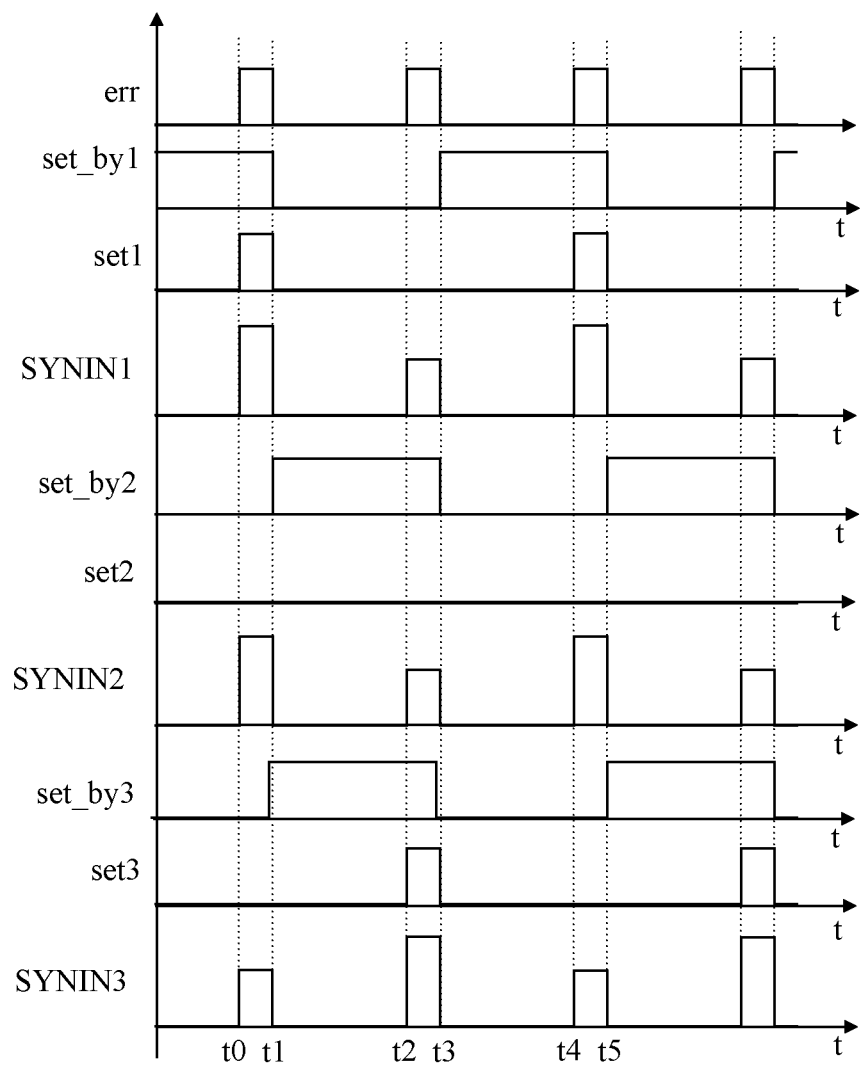
FIG. 5 is a logic timing diagram of second example operation of the multi-phase power converter, in accordance with embodiments of the present invention.

Referring now to FIG. 5, shown is a logic timing diagram of second example operation of the multi-phase power converter, in accordance with embodiments of the present invention. Here, three-phase power converter is exemplified, and the first control module is the master control module, and the other two control modules are slave modules. Also, the second control module can be under the phase-cut mode, and the first control module and the third control module may operate under the normal mode. In order for description, the transmission signals output by the first to third control modules are respectively SYNIN1, SYNIN2, and SYNIN3, the enable signals generated in the first to third control modules are respectively set_by1, set_by2, and set_by3, and the set signal generated in the first to third control modules are respectively set1, set2, and seta.

During time period t0-t1, the first pulse of synchronization control signal err can be generated by the first control module, and enable signal set_by1 may be initialized to be at a high level. Thus, set signal set1 can be at a high level, such that PWM control signal PWM is active to control the power stage circuit corresponding to the first control module to operate. Also, the indication signal with the first level may be generated at port SYNOUT (that is, the first pulse of transmission signal SYNIN1 in FIG. 5 is at the first level during time period t0-t1) and can be transmitted to port SYNIN of the second control module. Since the second control module is in the phase-cut mode, controlled switch 144 in the second control module may be on. Thus, ports SYNIN and SYNOUT of the second control module can be directly connected. As shown in FIG. 5, the first pulses of transmission signals SYNIN1 and SYNIN2 may be at the first level. At time t1, the second and third control modules can detect the falling edge of the indication signal, and enable signals set_by2 and set_by3 may be at a high level. However, since the mode control signal at port PS of the second control module is low, set signal set2 may remain at a low level, and thus the corresponding power stage circuit may not operate.

However, for the third control module, the second pulse of synchronization control signal err can be generated during time period t2-t3, and may be directly transmitted to the third control module. During this period, set signal set3 may turn to be at a high level, such that PWM control signal PWM becomes active, and the power stage circuit corresponding to the third control module can operate. In addition, the indication signal with the first level may be generated at port SYNOUT of the third control module (e.g., the second pulse of transmission signal SYNIN3 is at the first level in FIG. 5) and can be transmitted to port SYNIN of the first control module. After that, when the third pulse of synchronization control signal err is generated during time period t4-t5, the first control module can control the corresponding power stage circuit to operate again. Along these lines, the multi-phase converter can operate periodically according to the above-mentioned operating process.

The embodiments disclose a control module and a multi-phase power converter using the control module. The control module can include a first port and a second port. The first port can connect to the second port of the previous control module to receive the transmission signal for the current module, and the second port can connect to the first port of the next control module. The first port can connect to output the next transmission signal of the control module. The multi-phase power converter may have multiple power stage circuits, and each power stage circuit can correspond to one control module. In the multi-phase power converter, the operation states of the power converter of each phase can be sequentially adjusted according to the corresponding transmission signal, and phase cut control can also be realized, which may improve chip pin utilization.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus comprising a plurality of control modules coupled to a multi-phase power converter having a plurality of power stage circuits correspondingly coupled to the plurality of control modules, each control module comprising:
   a) a first port coupled to a second port of a previous control module;
   b) a second port coupled to a first port of a next control module, and being configured to generate a transmission signal for the next control module; and
   c) wherein the transmission signal comprises an indication signal and a synchronization control signal, the indication signal received through the second port of a current control module is configured to instruct the current control module to enter an enable state, and the current control module receiving the synchronization control signal through the second port to generate a drive signal to adjust a switching state of the corresponding power stage circuit after the current control module enters the enable state.

2. The apparatus of claim 1, wherein the transmission signal is a signal comprising a plurality of pulses with at least two different levels to represent the at least two types of information.

3. The apparatus of claim 1, wherein the transmission signal is a signal comprising a plurality of pulses with at least two different pulse widths to represent the at least two types of information.

4. The apparatus of claim 1, wherein the indication signal is characterized by a pulse with a first level in the transmission signal, and the synchronization control signal is characterized by a pulse with a second level in the transmission signal.

5. The apparatus of claim 1, wherein:
   a) when the synchronization control signal is active in the enable state, the indication signal for the next control module is allowed to be transmitted; and
   b) when the synchronization control signal is inactive, the current control module exits the enable state, thereby allowing the synchronization control signal for the next control module to be transmitted.

6. The apparatus of claim 1, wherein each control module further comprises a third port configured to receive a mode control signal to control the current control module to operate in a normal mode or a phase-cut mode.

7. The apparatus of claim 6, wherein when all of the plurality of control modules operate in the normal mode, indication signals for the plurality of control modules are sequentially activated, in order to control the corresponding power stage circuits to operate in turn.

8. The apparatus of claim 6, wherein when the current control module operates in the phase-cut mode, the transmission signal generated by the previous control module is directly transmitted to the next control module.

9. The apparatus of claim 1, wherein one of the plurality of control modules is configured as a master control module, other of the plurality of control modules are configured as slave control modules, and the synchronization control signal is generated by the master control module.

10. The apparatus of claim 9, further comprising a synchronization control signal generation module configured to generate the synchronization control signal according to a reference signal and a feedback signal characterizing an output signal of the multi-phase power converter, when the current control module is configured as the master control module.

11. The apparatus of claim 4, further comprising a first transmission module configured to allow the synchronization control signal to be transmitted to the next control module through the second port of the current control module, after the current control module exits the enable state.

12. The apparatus of claim 11, further comprising a clamp circuit configured to clamp a signal transmitted through the first transmission module to the second port to be not greater than the second level.

13. The apparatus of claim 6, wherein when the current control module operates in the phase-cut mode, the synchronization control signal is ignored by the current control module, thereby a set signal that controls an operation state of the corresponding power stage circuit is always inactive, to control the corresponding power stage circuit not to operate.

14. An apparatus, comprising a plurality of control modules coupled to a multi-phase power converter having a plurality of power stage circuits correspondingly coupled to the plurality of control modules, each control module comprising:
   a) a first port coupled to a second port of a previous control module;
   b) a second port coupled to a first port of a next control module, and being configured to generate a transmission signal for the next control module;
   c) wherein the transmission signal comprises an indication signal and a synchronization control signal, the indication signal is configured to instruct a current control module to enter an enable state, and the synchronization control signal is configured to control the current control module to generate a drive signal to adjust a switching state of the corresponding power stage circuit after the current control module enters the enable state; and
   d) a set signal generation circuit configured to generate a set signal to control the operation state of the corresponding power stage circuit according to the synchronous control signal after the current control module enters the en able state.

15. The apparatus of claim 14, wherein the set signal generation circuit comprises an input terminal configured to receive the synchronous control signal when the control module is configured as a master control module, and to receive the transmission signal through the first port when the control module is configured as a slave control module.

16. The apparatus of claim 14, further comprising an enable signal generation circuit configured to generate an enable signal to indicate that the control module enters the enable state, when a level of the transmission signal is greater than a threshold.

17. The apparatus of claim 16, wherein the enable signal generation circuit comprises a comparison circuit configured to compare the transmission signal received by the first port with the threshold, and to generate an output signal, wherein the enable signal is set to be activated at a falling edge of the output signal, and is set to be inactive when the set signal is inactive.

18. An apparatus, comprising a plurality of control modules coupled to a multi-phase power converter having a plurality of power stage circuits correspondingly coupled to the plurality of control modules, each control module comprising:
   a) a first port coupled to a second port of a previous control module;
   b) a second port coupled to a first port of a next control module, and being configured to generate a transmission signal for the next control module;
   c) wherein the transmission signal comprises an indication signal and a synchronization control signal, the indication signal is configured to instruct a current control module to enter an enable state, and the synchronization control signal is configured to control the current control module to generate a drive signal to adjust a switching state of the corresponding power stage circuit after the current control module enters the enable state; and
   d) a second transmission module configured to generate the indication signal at a second port of the current control module according to the synchronization control signal, when the current control module operates in a normal mode and is in the enable state.

* * * * *